(12) United States Patent
Loewe et al.

(10) Patent No.: US 8,997,316 B2
(45) Date of Patent: Apr. 7, 2015

(54) ADAPTER, ASSEMBLY UNIT COMPRISING AN ADAPTER AS WELL AS A METHOD OF INSTALLING SUCH AN ASSEMBLY UNIT

(75) Inventors: Hubert Loewe, Weselberg (DE); Oliver Marx, Schallodenbach (DE); Juergen Hofmann, Elsenberg (DE)

(73) Assignee: TRW Automotive Electronics & Components GmbH, Radolfzell (DE)

( * ) Notice: Subject to any disclaimer, the term of this patent is extended or adjusted under 35 U.S.C. 154(b) by 365 days.

(21) Appl. No.: 13/524,019

(22) Filed: Jun. 15, 2012

(65) Prior Publication Data

US 2013/0014353 A1  Jan. 17, 2013

(30) Foreign Application Priority Data

Jul. 11, 2011 (DE) .......................... 10 2011 107 080

(51) Int. Cl.
| | | |
|---|---|---|
| B60R 11/00 | (2006.01) | |
| B60R 13/02 | (2006.01) | |
| B23P 17/04 | (2006.01) | |
| F16B 17/00 | (2006.01) | |
| F16B 5/06 | (2006.01) | |
| F16B 21/07 | (2006.01) | |

(52) U.S. Cl.
CPC ........... B60R 13/0206 (2013.01); F16B 5/0628 (2013.01); F16B 21/075 (2013.01); F16B 5/0657 (2013.01)

(58) Field of Classification Search
CPC ........ F16B 5/06; F16B 5/0628; F16B 21/075; B60R 13/0206
USPC ...................................... 24/297, 581.11, 458
See application file for complete search history.

(56) References Cited

U.S. PATENT DOCUMENTS

| | | | | |
|---|---|---|---|---|
| 4,505,611 | A * | 3/1985 | Nagashima et al. ............ | 24/297 |
| 5,651,634 | A * | 7/1997 | Kraus ........................ | 403/408.1 |
| 6,254,302 | B1 * | 7/2001 | Kraus ............................ | 403/326 |
| 6,409,446 | B1 | 6/2002 | Schwarz | |
| 7,328,489 | B2 * | 2/2008 | Leverger et al. ................ | 24/297 |
| 7,748,089 | B2 * | 7/2010 | Jalbert et al. .................... | 24/297 |
| 7,785,030 | B2 * | 8/2010 | Klein ............................. | 24/453 |
| 7,927,050 | B2 * | 4/2011 | Koike .......................... | 411/104 |
| 2003/0000048 | A1 | 1/2003 | Boville | |
| 2006/0000064 | A1 * | 1/2006 | Leverger et al. ................ | 24/297 |
| 2007/0098523 | A1 | 5/2007 | Klein | |
| 2008/0219758 | A1 | 9/2008 | Jatzke | |
| 2011/0154621 | A1 | 6/2011 | Ehrhardt et al. | |

FOREIGN PATENT DOCUMENTS

| | | |
|---|---|---|
| DE | 29701469 | 6/1997 |
| DE | 19748780 | 5/1998 |
| DE | 29920497 | 3/2000 |
| DE | 10023109 | 11/2001 |
| DE | 10053200 | 5/2002 |
| DE | 202005016824 | 2/2006 |
| DE | 202007002071 | 7/2007 |
| DE | 102008033307 | 1/2010 |
| EP | 1211137 | 6/2002 |
| EP | 2261516 | 12/2010 |
| WO | 01/50026 | 7/2001 |

* cited by examiner

*Primary Examiner* — Robert J Sandy
(74) *Attorney, Agent, or Firm* — Tarolli, Sundheim, Covell & Tummino LLP (57) ABSTRACT

An adapter for the vehicle-side installation of a component, in particular of a lining part, has a first fastening element to which a component-side holding piece can be attached, and a second fastening element to which a vehicle-side retaining element can be attached. The first and second fastening elements are coupled to each other via at least one spring element so as to be movable to a limited extent.

14 Claims, 5 Drawing Sheets

ADAPTER, ASSEMBLY UNIT COMPRISING AN ADAPTER AS WELL AS A METHOD OF INSTALLING SUCH AN ASSEMBLY UNIT

TECHNICAL FIELD OF THE INVENTION

The invention relates to an adapter for the vehicle-side installation of a component, in particular of a lining part, as well as to an assembly unit comprising an adapter of this type. The invention further relates to a method of installing such an assembly unit.

BACKGROUND OF THE INVENTION

From the prior art, various multi-part fastening assembly units for the vehicle-side installation of lining parts or other components in the vehicle interior space are known. Usually, these assembly units consist of a fastening pin which is attached to the vehicle side, and a holding piece which is attached to the lining part and, for example, may be pre-installed on the latter. The fastening pin and the holding piece comprise corresponding latching elements which for assembling the components can be pushed into each other and latched to each other, allowing a simple installation of the lining part on the vehicle. Due to manufacturing tolerances, however, it may happen in particular with large-surface components that the position of the receptacles which are provided on the vehicle side and the side of the lining part for the fastening clip and the holding piece, respectively, do not match exactly. This may result in undesired deformations or in gaps in the vehicle interior space which have different sizes. In the extreme case, the component can not be mounted due to these inaccuracies.

It is the object of the invention to provide a fastening assembly unit capable of accommodating such manufacture-related inaccuracies. It is further the object of the invention to provide a method of installing such an assembly unit.

BRIEF SUMMARY OF THE INVENTION

In order to achieve the object, an adapter is provided for the vehicle-side installation of a component, in particular of a lining part, comprising a first fastening element to which a component-side holding piece can be attached, and a second fastening element to which a vehicle-side retaining element can be attached. According to the invention, the first and second fastening elements are coupled to each other via at least one spring element so as to be movable to a limited extent. Such adapter is arranged as an additional component between the fastening pin and the holding piece, the fastening pin being connected to the second fastening element of the adapter and the holding piece being connected to the first fastening element. The fastening elements are movable relative to each other by a limited extent due to the spring arranged therebetween. This is how manufacturing tolerances can be accommodating mutually moving the fastening elements. Since the fastening elements are always coupled to each other such that the displacement path of the fastening elements relative to each other is limited, a secure grip of the component in the vehicle is ensured. By means of the spring elements, a restoring force is additionally provided, minimizing undesired movements of the component.

The first fastening element is preferably formed to be essentially cylinder-shaped and encloses the second fastening element in circumferential direction. Thus, the fastening elements are arranged one inside the other, whereby the height of the adapter may be reduced in direction of the cylinder longitudinal axis. Moreover, the outer, first fastening element forms a shoulder for the inner, second fastening element, limiting the movement of the second fastening element. This means that a certain degree of fixation is provided despite of the movability of the fastening elements relative to each other, preventing an uncontrolled shifting of the component and limiting the displacement path.

The second fastening element may also be formed to be essentially cylinder-shaped, the cylinder longitudinal axes of both fastening elements being concentric. In the condition as delivered, the adapter offers commensurate balancing capabilities in all directions perpendicular to the cylinder longitudinal axis. Due to the ratio of the diameters of the fastening elements relative to each other, the desired clearance can be defined very precisely so that an ideal trade-off between tolerance compensation, clearance of the component and sufficient grip of the lining parts can be ensured.

It is preferred that the spring element, in a cross-section perpendicular to the cylinder longitudinal axis, extends spirally from the first fastening element towards the second fastening element. In addition to the possibility of accommodating the tolerances in the cross-sectional plane perpendicular to the cylinder longitudinal axis, a certain amount of rotating the fastening elements relative to each other as well as a compensation in the direction of the cylinder longitudinal axis is also made possible.

In order to provide almost equal restoring forces in all directions in the cross-sectional plane, several spring elements are provided so as to be uniformly distributed in circumferential direction, for example.

Due to the cylindrical fastening elements being arranged one inside the other, the movability of the inner, second fastening element in a plane perpendicular to the cylinder longitudinal axis is limited. In order to restrict the movement of the fastening elements relative to each other also in the direction of the cylinder longitudinal axis, cooperating stop elements are preferably provided on both fastening elements, which limit the displacement path of the fastening elements in the direction of the cylinder longitudinal axis. This ensures, for example, that the fastening elements during pushing in the retaining element or the holding piece can not yield in the direction of the cylinder longitudinal axis. This ensures a simple installation, especially if the connection between the components is effected by latching connections.

The stop elements, for instance, are formed by a protrusion on one of the two fastening elements, engaging a recess provided on the other fastening element. This recess may also serve as a guiding means, for instance, in which the fastening element is guided by the protrusion during a movement in the direction of the cylinder longitudinal axis. By means of an appropriate design of the recess, the latter may also serve as a stop element counteracting an excessive mutual rotation of the fastening elements. The desired allowable angle of rotation can be adjusted in a very precise manner through a recess with a corresponding size.

The first and/or the second fastening element comprise(s) a receptacle for a vehicle-side retaining element or a component-side holding piece, for example.

The receptacle comprises latching elements, for instance, which are able to cooperate with vehicle-side or component-side latching elements so that the component may be installed in the vehicle without using any tools.

According to the invention, there is further provided an assembly unit for the vehicle-side installation of a component, in particular of a lining part, comprising an adapter according to the invention, a fastening pin capable of being attached to the vehicle-side, and a holding piece which can be attached to the component, in particular to the lining part, the adapter allowing a limited movement between the fastening pin and the holding piece.

The fastening pin comprises a latching protrusion, for instance, which is pushed into a vehicle-side opening and can be fixed in the latter in particular by a latching mechanism, as well as a bolt which can be pushed into a receptacle of the second fastening element of the adapter and fixed in it.

The fastening pin may comprise a gasket for sealing the opening.

The gasket of the fastening pin may consist of a thermoplastic elastomer. A polyester-elastomer may be used for the thermoplastic elastomer, for example. When the fastening pin has been pushed into the vehicle-side opening, the thermoplastic elastomer can be plasticized under the effect of temperature. This allows melting or gluing the gasket of the fastening pin on the car body part surrounding the vehicle-side opening. It is possible to insert the fastening pin in the vehicle-side opening prior to painting the car body part so that the elastomer is plasticized under the effect of the temperature supply required for hardening the lacquer. In case of repair in which the fastening pin has to be fixed again, it is further possible to carry out the gluing process of the gasket by means of a commercial hot-air device. Likewise, it goes without saying that gluing the gasket results in an additional fixation of the fastening pin on the car body part surrounding the vehicle-side opening.

The holding piece may be integrally connected to the component so that it does not have to be additionally installed on the component, but is connected thereto in undetachable manner. As compensating for tolerances is exclusively effected by the adapter, the holding piece can be firmly connected to the component since the latter does not have to fulfill any compensating function.

According to the invention, a method of installing such an assembly unit is provided, comprising the following steps:
- the fastening pin is pushed into a vehicle-side opening and fixed in it;
- the adapter is attached to the holding piece of the component; and
- the adapter is connected to the fastening pin.

The fastening pin may be glued to the vehicle such that the vehicle-side opening is sealed.

Alternatively, the method may also be carried out by the following steps:
- the adapter is attached to the holding piece of the component;
- the adapter is connected to the fastening pin; and
- the fastening pin is pushed into a vehicle-side opening and fixed in it.

With this method, the entire assembly unit is pre-installed on the component and then mounted to the vehicle side. In this case, a sealing function may be established by a flexible gasket on the fastening pin. This gasket achieves sufficient tightness even without gluing it to the vehicle.

DETAILED DESCRIPTION OF THE PREFERRED EMBODIMENT

Figure 1:
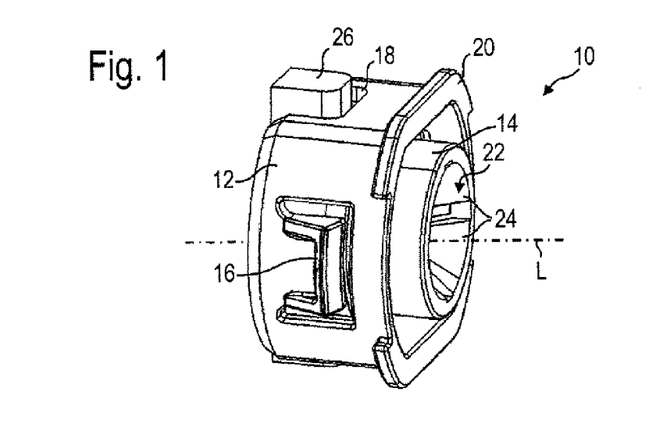
FIG. 1 is a perspective view of an adapter according to the invention.

FIG. 1 shows an adapter 10 for the vehicle-side installation of a component 46. A holding piece 32 which is connected to a component such as an interior space lining part, for instance, as well as a vehicle-side retaining element (see FIG. 6) can be attached to the adapter 10. To this end, the adapter 10 comprises a first fastening element 12 to which the holding piece 32 may be attached, as well as a second fastening element 14 for attaching the vehicle-side retaining element.

Both fastening elements 12, 14 are formed so as to be essentially cylinder-shaped. As can be seen in particular in FIG. 2, the first fastening element 12 encloses the second fastening element 14 in circumferential direction, the cylinder longitudinal axes L of the two fastening elements 12, 14 being concentric.

Two opposite latching protrusions 16 are provided for attaching the holding piece 32 to the first fastening element 12, which are able to latch in place on the component-side holding piece 32. Further, the first fastening element 12 comprises two recesses 18 extending in the cylinder longitudinal direction L, as well as a flange 20.

The second fastening element 14 comprises a receptacle 22 with latching elements 24 into which a vehicle-side retaining element such as a fastening pin 30 may be inserted. As can be seen in particular in FIGS. 2 and 3, the second fastening element 14 is provided with two protrusions 26 which project perpendicularly towards the cylinder longitudinal axis L and are arranged in the recesses 18, however, without resting against the edge of the recess 18 in the as-delivered condition illustrated in the FIGS. 1 to 3. As will be explained in the following, the recess 18 together with the protrusions 26 form a stop element in each case, limiting the movement of the fastening elements 12, 14 relative to each other.

The adapter 10 serves for compensating or accommodating of tolerances between the retaining element and the holding piece 32. To this end, the fastening elements 12, 14 connected to the holding piece 32 and the retaining element are formed so as to be movable relative to each other to a limited extent, as will be explained below, so that moving the fastening elements 12, 14 relative to each other allows compensating any manufacturing tolerances in the position of the component-side holding piece 32 and of the vehicle-side retaining element.

Figure 2:
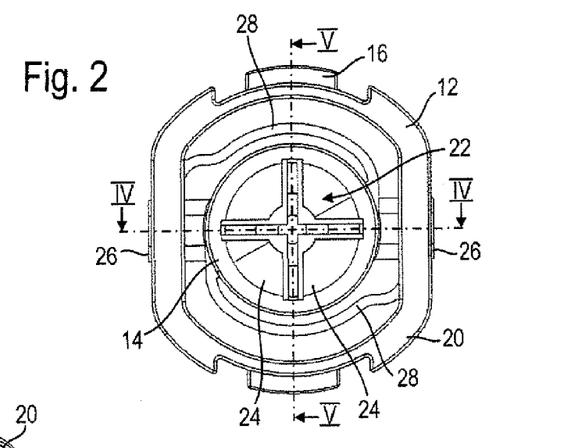
FIG. 2 is a top view of the adapter of FIG. 1.
Figure 3:
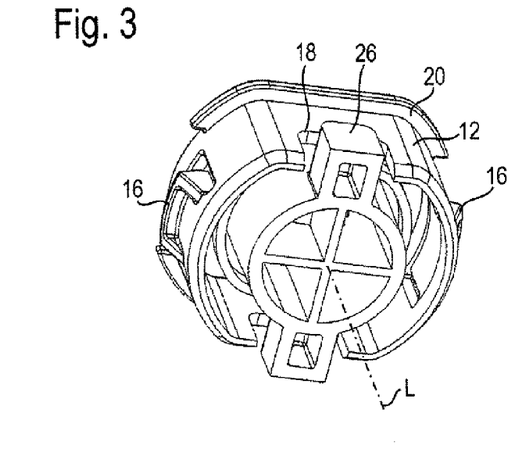
FIG. 3 is a second perspective view of the adapter of FIG. 1.
Figure 4:
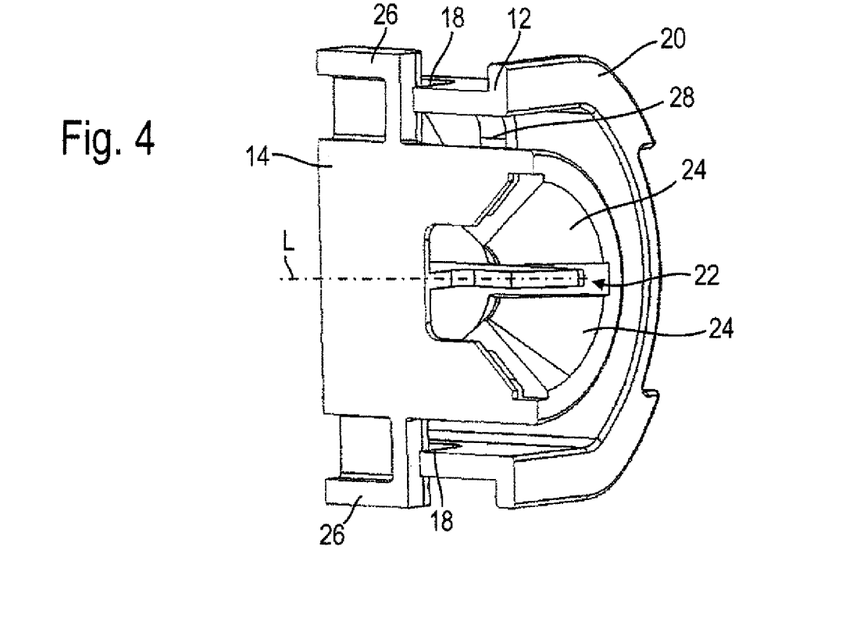
FIG. 4 is a sectional view in the plane IV-IV of FIG. 2.
Figure 5:
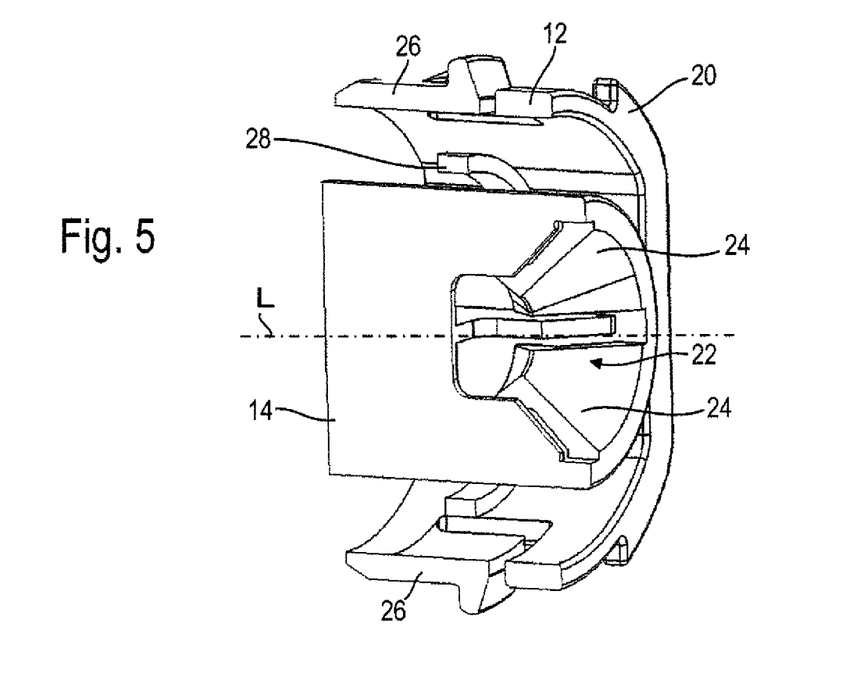
FIG. 5 is a sectional view in the plane V-V of FIG. 2.

As can be seen in particular in FIG. 2, the first and second fastening elements 12, 14 are connected to each other through spring elements 28 acting upon the second fastening element with a restoring force as soon as the latter is displaced out of its center position shown in FIGS. 1 to 3. In the embodiment which is shown here, the spring elements 28 extend in spiral shape from the outer, first fastening element 12 to the inner, second fastening element 14.

By means of these spring elements 28, the second fastening element 14 is supported within the first fastening element 12 in a floating manner, so to speak. This means that the second fastening element 14 is supported within the first fastening element 12 so as to be movable in a plane perpendicular to the cylinder longitudinal axis L. Due to the flexibility of the spring elements 28, a certain degree of rotation about the cylinder longitudinal axis L as well as a movement in direction of the cylinder longitudinal axis is made possible.

The movement in the plane perpendicular to the cylinder longitudinal axis is limited by the outer, first fastening element 12. A movement in the direction of the cylinder longitudinal axis L is limited by the stop elements formed by the recesses 18 and the protrusions 26.

Figure 6:
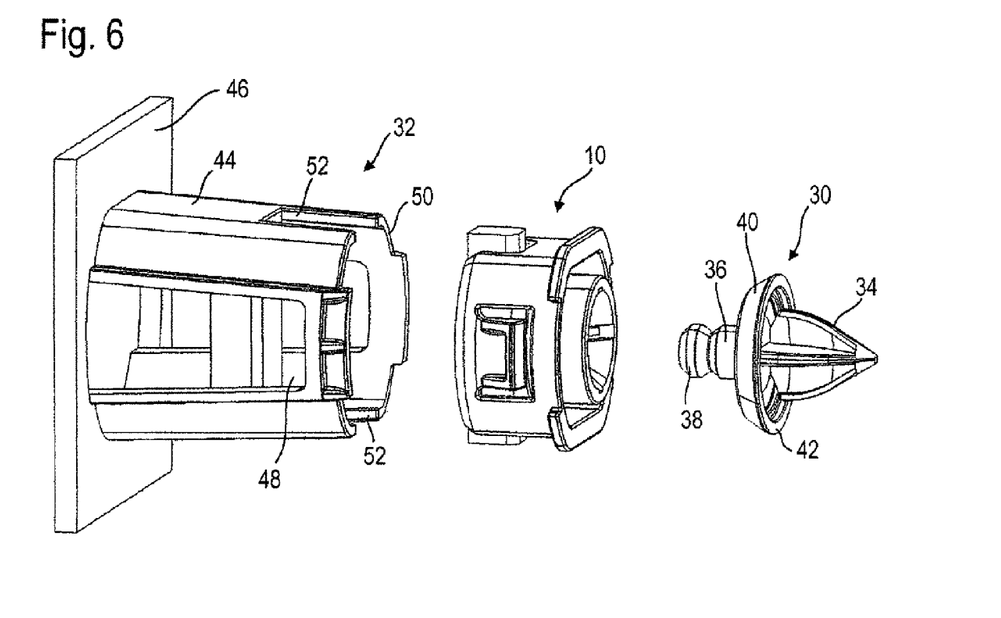
FIG. 6 shows an assembly unit according to the invention.

An assembly unit comprising an adapter 10 of this type is illustrated in FIG. 6. Apart from the adapter 10, the assembly unit comprises a fastening pin 30 as well as a holding piece 32.

Figure 7:
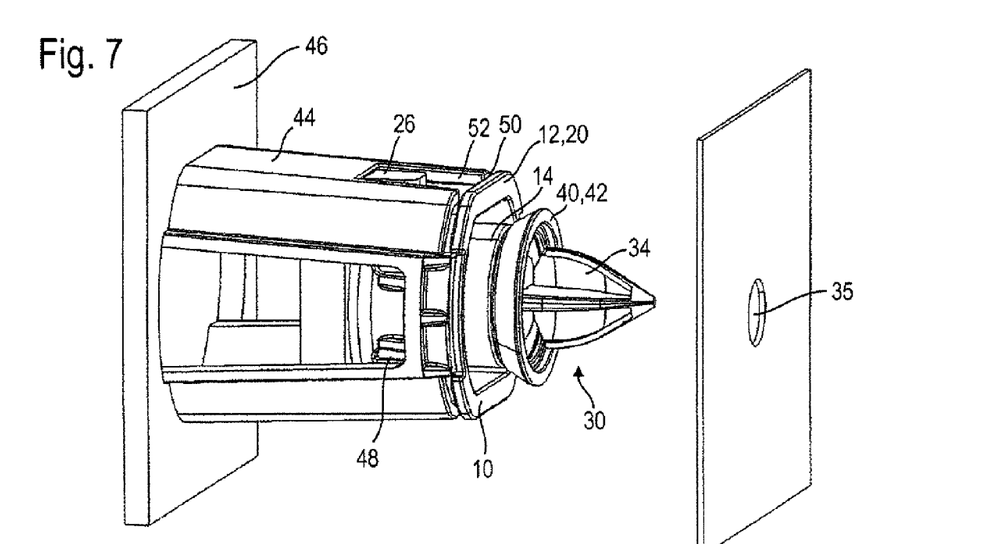
FIG. 7 shows a first step of installing the assembly unit according to the invention of FIG. 6.

The fastening pin 30 comprises a latching protrusion 34 which can be pushed into a vehicle-side opening 35 and latched in place in it (see FIG. 7). Furthermore, the fastening pin 30 comprises a bolt 36 which may be pushed into the receptacle 22 of the second fastening element 14 of the adapter 10. The bolt 36 has a head 38 which can latch in place in the latching elements 24 provided in the receptacle 22. Ideally, the latching elements are designed such that they encompass the head of the bolt in a form-locking manner. In addition, a surrounding flange 40 is provided on the fastening pin 30 and may rest on the vehicle, as well as a surrounding gasket 42 serving for sealing the opening 35.

The holding piece 32 is formed here by a cylindrical dome 44 which in the embodiment shown here is integrally formed with the component 46 to be fastened. The diameter of the dome 44 is selected such that the adapter 10 can be partially pushed into it, with the diameter of the dome 44 being smaller than the diameter of the flange 20 of the adapter 10 so that the flange 20 rests on the front end 50 of the dome 44 in the installed state.

Provided on the outer wall of the holding piece 32 are first recesses 48 which may be engaged by the latching protrusions 16 of the adapter, whereby the adapter 10 may be fixed to the holding piece 32. Further, the dome 44 is provided with second recesses 52 receiving the protrusions 26 of the adapter 10 in addition to the recesses 18 of the adapter 10 when the assembly unit is installed.

In the embodiment illustrated here, the adapter 10 is attached to the holding piece 32, and the fastening pin 30 is pushed into the adapter 10 in a first installation step. Subsequently, the fully mounted assembly unit together with the component 46 is mounted to the vehicle-side by pushing the fastening pin 30 into the opening 35 in an insertion direction E and latching it in place in it (see FIG. 7).

As shown in particular in FIG. 7, the second recesses 52 define a further stop element for the protrusion 26 of the adapter 10 in the installed state of the assembly unit. Whereas the recess 18 provided on the first fastening element 12 is able to limit the movement of the fastening elements 12, 14 only in insertion direction E, the second recess 52 fulfills this function in the direction opposite to the insertion direction E so that the second fastening element 14 has only a limited movability in both directions of the cylinder longitudinal axis L. This is of importance in particular in order to be able to insert the fastening pin 30 in the receptacle 22 against the resistance of the latching elements 24. If it was not the case that the second fastening element 14 is prevented from moving against the insertion direction E by the protrusions resting against the second recesses 52, the second fastening element 14 would yield contrary to the insertion direction E during inserting the fastening pin 30 so that inserting the fastening pin 30 in the receptacle 22 would be impossible or at least considerably impeded.

Figure 8:
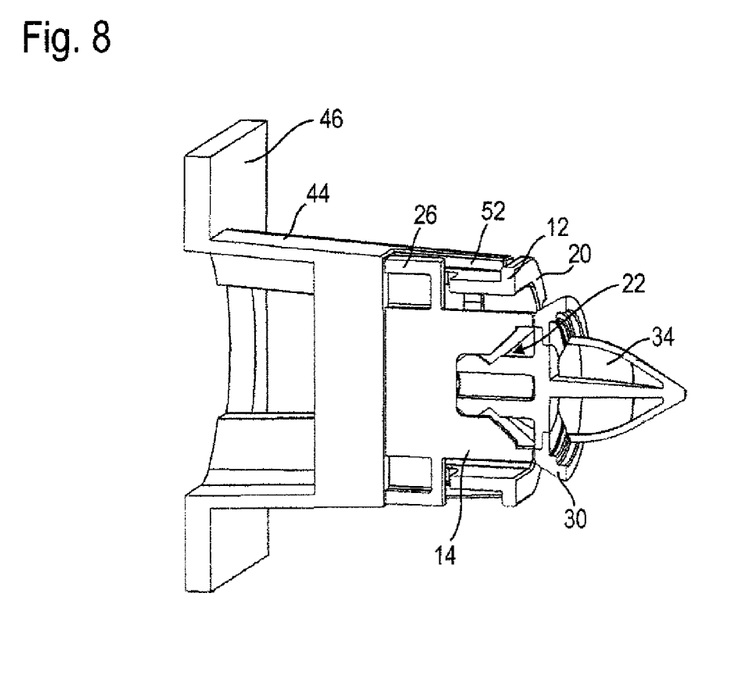
FIG. 8 is a cross-section through the installed assembly unit of FIG. 6.
Figure 9:
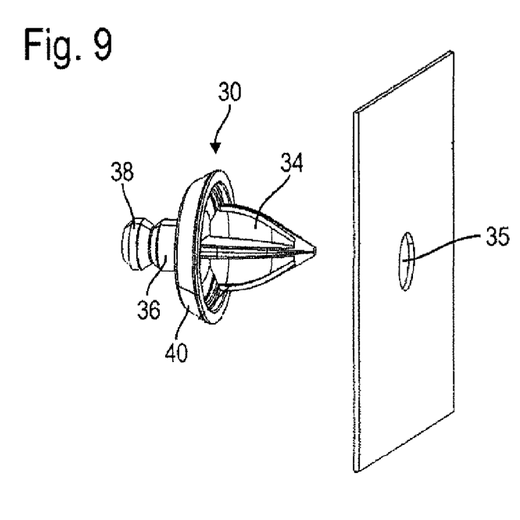
FIG. 9 shows a first installation step of a second installation method of the assembly unit of FIG. 6.

FIG. 8 illustrates the assembly unit according to the invention in cross-section. As can be seen in particular in FIG. 8, the height of the assembly unit of the invention is not much higher than the height of an assembly unit without such an adapter 10 due to the fastening elements 12, 14 being arranged one inside the other.

Figure 10:
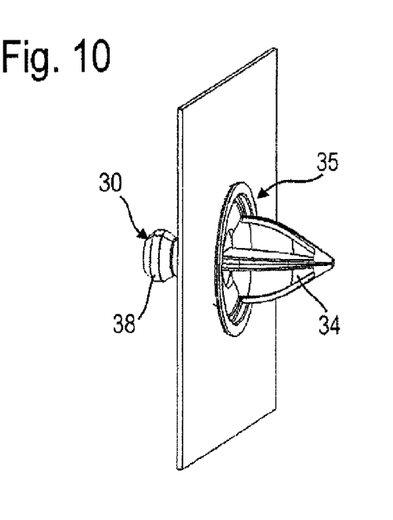
FIG. 10 shows a second installation step of the second installation method.

A second possibility of installing the assembly unit according to the invention is illustrated in FIGS. 9 to 12. In this embodiment, first the fastening pin 30 is pushed into the opening 35 and fixed thereon. Subsequently, the vehicle part with the fastening pin 30 attached thereon is varnished, the subsequent step of heating the lacquer causing melting and gluing the gasket 42 so that a particularly good sealing of the opening 35 is ensured (FIG. 10).

Figure 11:
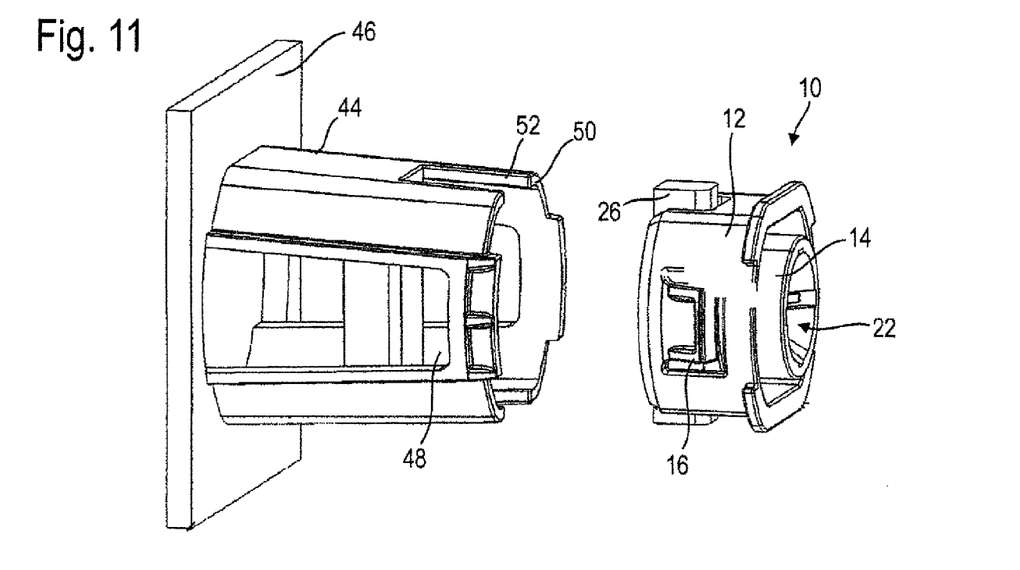
FIG. 11 shows a third installation step of the second installation method.
Figure 12:
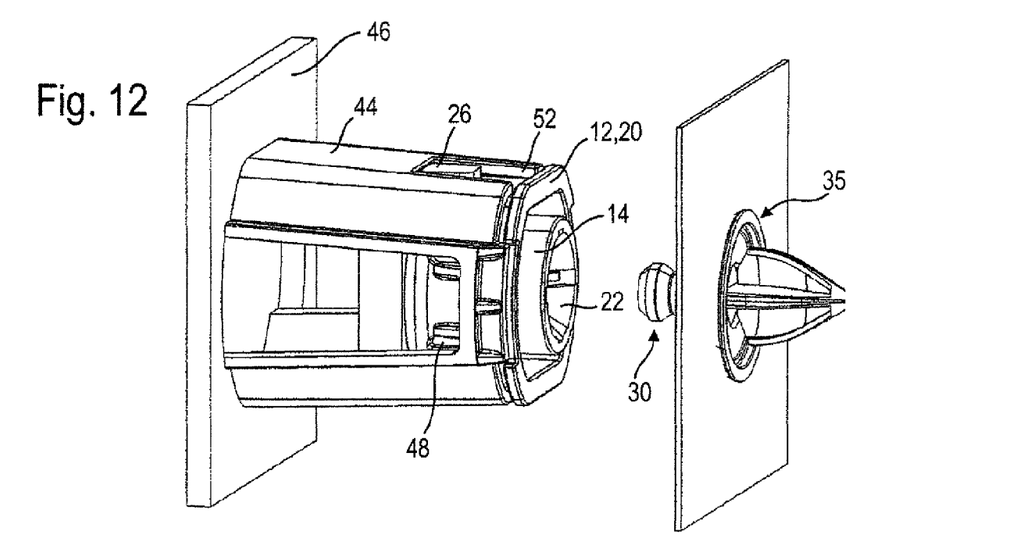
FIG. 12 shows a fourth installation step of the second installation method.

Subsequently, the adapter 10 is installed on the holding piece 32 (FIG. 11). It is only in the last installation step that the adapter 10 with the holding piece 32 attached thereon and the component 46 is attached to the fastening pin 30. As in this embodiment, too, the movement of the second fastening element 14 is limited by the second recesses 52 of the holding piece 32, any yielding of the second fastening element 14 during inserting the fastening pin 30 is prevented.

The invention claimed is:

1. An adapter for the vehicle-side installation of a component, in particular of a lining part,
   comprising a first fastening element to which a component-side holding piece can be attached, and
   a second fastening element to which a vehicle-side retaining element can be attached,
   wherein the first and second fastening elements are coupled to each other via at least one spring element so as to be movable to a limited extent, and
   wherein cooperating stop elements are provided on the first fastening element and the second fastening element, the first and second fastening elements being essentially cylindrical-shaped, and the stop elements limiting the displacement paths of the fastening elements relative to each other in the direction of the longitudinal axes of the cylinders.

2. The adapter according to claim 1, wherein the first fastening element encloses the second fastening element in a circumferential direction.

3. The adapter according to claim 2, wherein the cylinder longitudinal axes of both fastening elements are arranged to be coaxial.

4. The adapter according to claim 2, wherein the spring element, in a cross-section perpendicular to the cylinder longitudinal axis, extends spirally from the first fastening element towards the second fastening element.

5. The adapter according to claim 1, wherein several spring elements are provided so as to be uniformly distributed in a circumferential direction.

6. The adapter according to claim 1, wherein the cooperating stop elements include a protrusion provided on one of the fastening elements which engages a recess provided on the other fastening element.

7. The adapter according to claim 1, wherein the second fastening element comprises a receptacle for a vehicle-side retaining element.

8. The adapter according to claim 7, wherein the receptacle comprises latching elements.

9. An assembly unit for the vehicle-side installation of a component, in particular of a lining part,
    comprising an adapter according to claim 1,
    a fastening pin capable of being attached to the vehicle side, and
    a holding piece which can be attached to the component, in particular to the lining part,
    the adapter allowing a limited movement between the fastening pin and the holding piece,
    wherein the fastening pin comprises a latching protrusion which is pushed into a vehicle-side opening and can be fixed in the latter in particular by a latching mechanism, as well as a bolt which can be pushed into a receptacle of the second fastening element of the adapter for fixing therein.

10. The assembly unit according to claim 9, wherein the fastening pin comprises a gasket for sealing the opening.

11. The assembly unit according to claim 9, wherein the holding piece is integrally connected to the component.

12. A method of installing an assembly unit according to claim 9, comprising the following steps:
    pushing the fastening pin into a vehicle-side opening for fixing thereto;
    attaching the adapter to the holding piece of the component; and
    connecting the adapter to the fastening pin.

13. The method according to claim 12, characterized by gluing the fastening pin to the vehicle such that the vehicle-side opening is sealed.

14. A method of installing an assembly unit according to claim 9, comprising the following steps:
    attaching the adapter to a holding piece of the component;
    connecting the adapter to the fastening pin; and
    pushing the fastening pin into a vehicle-side opening for fixing therein.

* * * * *

UNITED STATES PATENT AND TRADEMARK OFFICE
CERTIFICATE OF CORRECTION

PATENT NO.        : 8,997,316 B2
APPLICATION NO.   : 13/524019
DATED             : April 7, 2015
INVENTOR(S)       : Hubert Loewe et al.

Page 1 of 1

It is certified that error appears in the above-identified patent and that said Letters Patent is hereby corrected as shown below:

On the Title Page
"(75): Inventor's Address Hofmann, Elsenberg," should be -- (75) Inventor's Address -- Hofmann, Eisenberg --.

Signed and Sealed this
First Day of September, 2015

Michelle K. Lee
*Director of the United States Patent and Trademark Office*